United States Patent [19]

Bartlett et al.

[11] 4,159,444

[45] Jun. 26, 1979

[54] FAIL OPERATIONAL DUAL ELECTROMECHANICAL SERVO ACTUATOR FOR AIRCRAFT WITH MODEL MONITORING

[75] Inventors: Larry A. Bartlett; Curtis M. Campbell; Ronald I. Tesdal, all of Phoenix, Ariz.

[73] Assignee: Sperry Rand Corporation, New York, N.Y.

[21] Appl. No.: 888,713

[22] Filed: Mar. 21, 1978

[51] Int. Cl.² ............................................. G05B 9/02
[52] U.S. Cl. ................................... 318/564; 318/565; 244/194
[58] Field of Search ................... 318/565, 561, 564; 244/194, 195

[56] References Cited

U.S. PATENT DOCUMENTS

| | | | |
|---|---|---|---|
| 3,422,327 | 1/1969 | McBrayer | 244/194 X |
| 3,504,248 | 3/1970 | Miller | 318/561 |
| 3,719,878 | 3/1973 | Ferguson | 318/565 |
| 4,035,705 | 7/1977 | Miller | 318/564 |
| 4,094,481 | 6/1978 | DeWalt | 318/564 |
| 4,095,763 | 6/1978 | Builta | 244/194 |

*Primary Examiner*—B. Dobeck
*Attorney, Agent, or Firm*—Howard P. Terry; Albert B. Cooper

[57] ABSTRACT

The dual electromechanical servo actuator comprises two electric servo motors coupled through differential gearing to position an output member in accordance with an input signal. Tachometer generators coupled to the respective output shafts of the servo motors, (and normally integral with the motors) provide rate feedback signals to the respective inputs of the servo amplifiers driving the respective motors. An electronic model of the dual servo actuators responsive to the input signal provides a rate signal simulating the tachometer responses to the input signal. A monitor compares the two tachometer signals and provides a failure signal when the difference therebetween exceeds a predetermined threshold. The monitor also simultaneously compares the model rate ouptut with the individual tachometer signals to determine which of the two servo channels has failed. The monitor circuits apply a brake to the servo motor output shaft of the failed channel. The remaining channel continues to properly position the output member through the differential gearing. For certain applications of the invention the monitor continues to compare the model rate output with the tachometer signal from the operating channel so as to detect a failure of the second channel and provide a fail passive condition.

25 Claims, 6 Drawing Figures

FAIL OPERATIONAL DUAL ELECTROMECHANICAL SERVO ACTUATOR FOR AIRCRAFT WITH MODEL MONITORING

BACKGROUND OF THE INVENTION

1. Field of the Invention

The invention relates to dual electromechanical servo actuators with model monitoring to provide fail operational characteristics.

2. Description of the Prior Art

Dual electromechanical servo actuators are known in the art and are exemplified by those disclosed in Applicant' assignee's pending U.S. patent application Ser. No. 811,653 entitled "Fail Passive Dual Servo With Continuous Motor Speed and Acceleration Monitoring" by M. T. DeWalt, filed June 30, 1977; Applicants' assignee's U.S. Pat. No. 4,035,705 entitled "Fail-Safe Dual Channel Automatic Pilot With Maneuver Limiting" By H. Miller issued July 12, 1977 and applicants' assignee's U.S. Pat. No. 3,504,248 entitled "Dual Channel Servo System Having Torque Equalization" by H. Miller issued Mar. 31, 1970.

These dual electromechanical servo actuators comprise two channels each including an electric servo motor driven by a servo amplifier. The motor output shafts are coupled through differential gearing to drive the output member. A tachometer generator, normally an integral part of each motor, provides an output shaft rate feedback signal to the input of the associated servo amplifier. A brake is included on the output shaft of each servo motor to clamp the shaft thereby disabling the channel.

These prior art electromechanical servo actuators exhibit fail passive or fail safe characteristics in that should one of the channels fail, various means are provided in the prior art arrangements for applying the brake of the defective channel permitting the operative channel to continue to position the output member through the differential gearing. In a commercial aviation environment, a second failure (such as a hardover) in the remaining channel could result in catastrophic loss of the aircraft. Thus, commercial aviation regulatory agencies require that after the first failure has occurred, the flight control system, of which the servo actuator is a part, be disengaged with manual control assumed by the pilot.

Although the above discussed dual electromechanical servo actuators adequately provide the intended performance as fail safe actuators, it is desirable under certain circumstances to provide fail operational performance with such actuators without an attendant increase in complexity, expense, bulk or weight.

As discussed in said Ser. No. 811,653, it is desirable to detect failures as rapidly as possible and quickly advise the pilot of the failed channel even though during the detection and advisory period the control surface will not significantly deflect due to the torque transmission characteristic of the differential. Although the servo actuator of said Ser. No. 811,653 adequately achieves this particular objective, the servo of Ser. No. 811,653 is fail passive rather than fail operative. Thus, not only is rapid failure detection desirable, but a high probability of detecting the failures and isolating the failures is also desirable, particularly for servo actuators for positioning aircraft primary control surfaces. Fast detection of failure and high reliability as therefore desiderata of the present invention.

SUMMARY OF THE INVENTION

The above desiderata and objectives of the present invention are achieved by dual electromechanical servo channels including first and second electromechanical servo actuators coupled through differential gearing to drive a common positionable load. Each electric servo motor includes a brake for clamping the output thereof. An electronic model is included to simulate an output characteristic of the servo channels in response to the actuator input signal. A monitor compares the simulated characteristic from the model with the actual characteristics from each of the servo channels and provides a signal to actuate the brake of the channel whose characteristic differs from the simulated characteristic with respect to a predetermined threshold.

Preferably each channel includes a tachometer for providing the actual channel rate characteristic which is compared in the monitor with the simulated rate characteristic provided by the model.

DESCRIPTION OF THE PREFERRED EMBODIMENT

Figure 1:
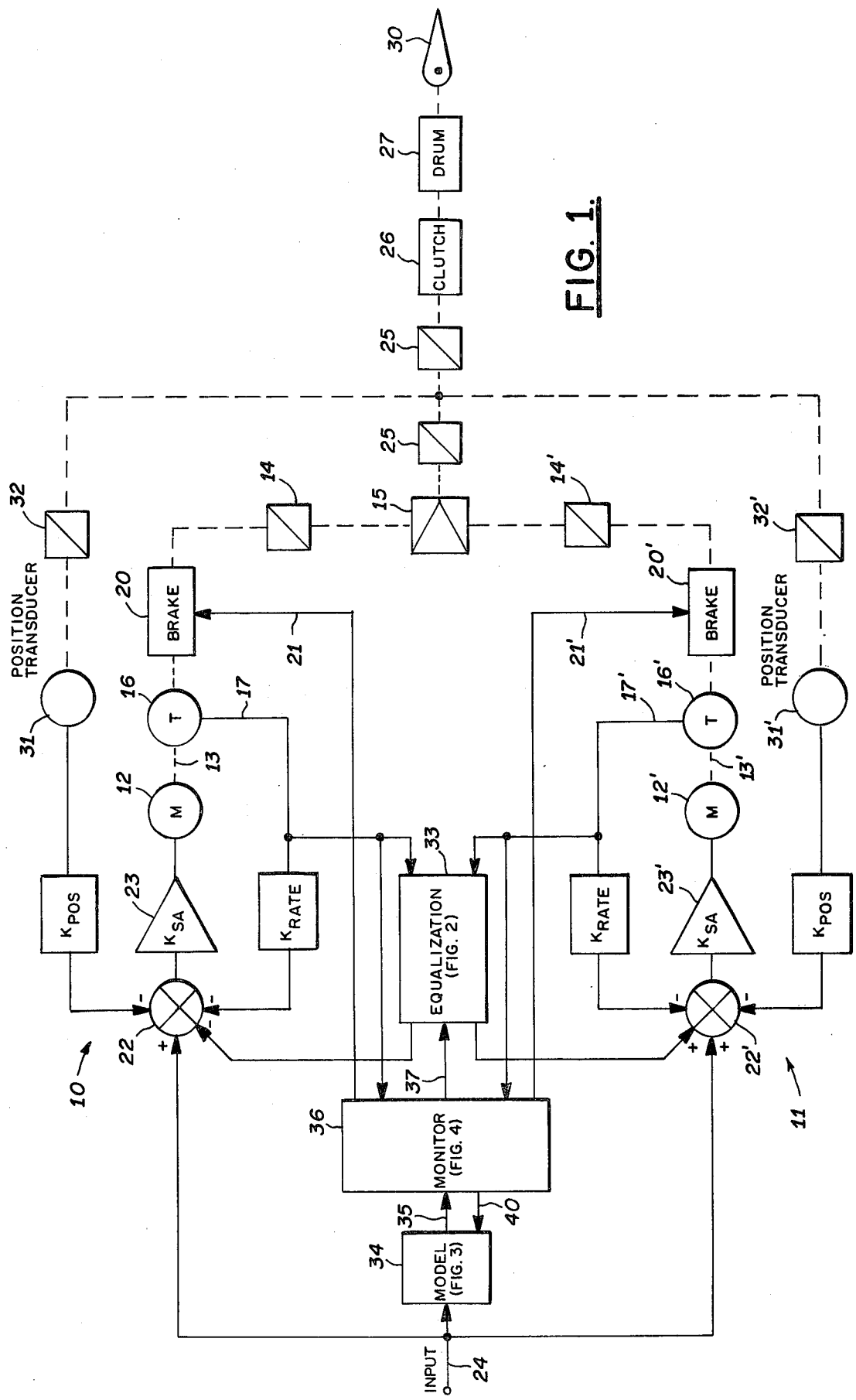
FIG. 1 is a schematic block diagram of the dual electromechanical servo actuator including model monitoring in accordance with the invention.
Figure 5:
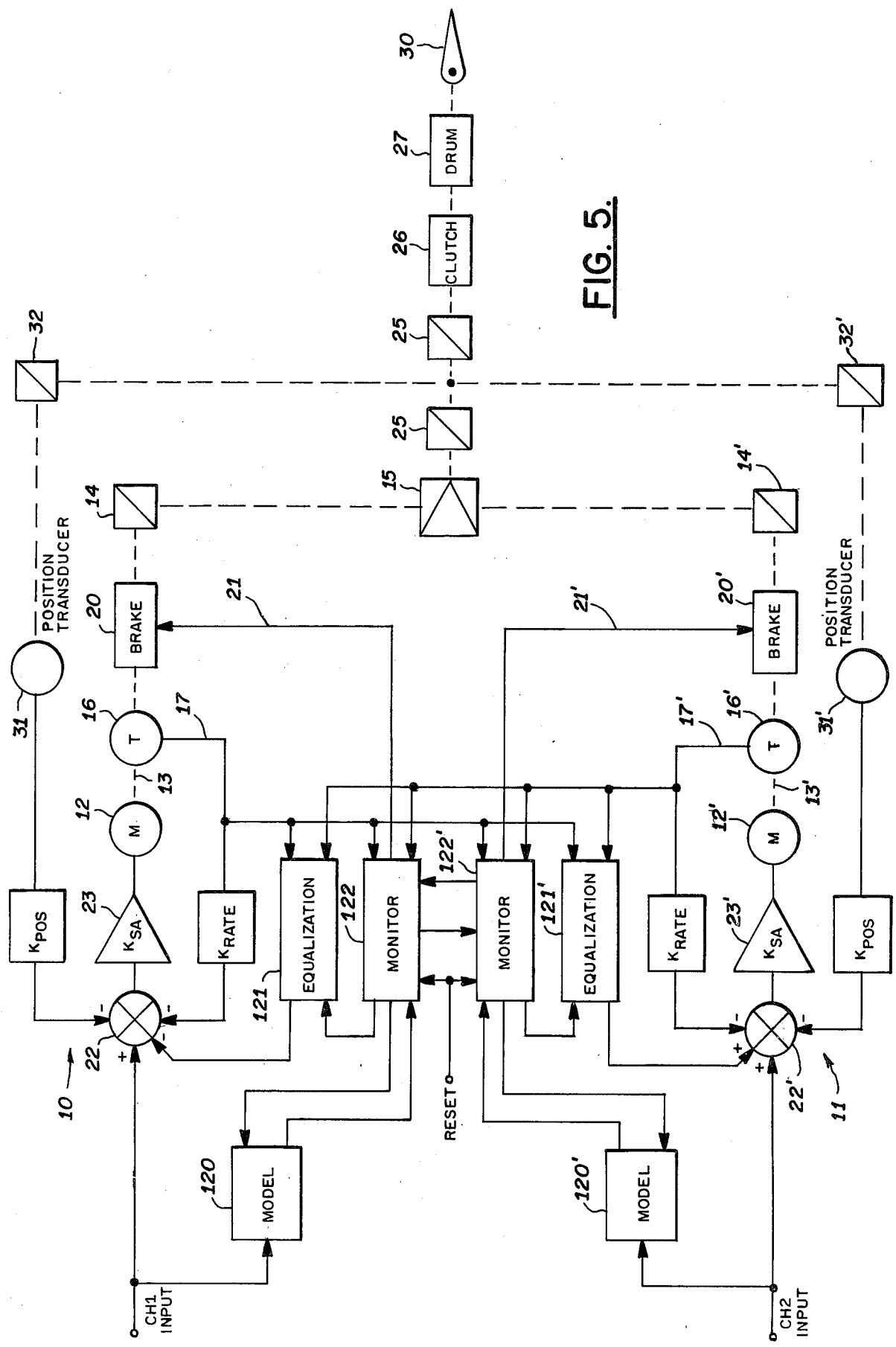
FIG. 5 is a schematic block diagram of a dual electromechanical servo actuator in accordance with the invention utilizing dual redundant model, equalization and monitor circuits.

The dual electromechanical servo actuator of the present invention may be embodied utilizing a single model monitor and equalizer to provide in effect a third channel to achieve the fail operational performance. This embodiment is responsive to a single input command and is illustrated in FIG. 1. The invention may also be embodied with dual redundant models, monitors and equalizers and may be responsive to either dual redundant input command source or to a common command source. The embodiment is illustrated in FIG. 5. Both the embodiments of FIG. 1 and FIG. 5 may be configured in a fail operational, unmonitored mode whereby a first failure disables the defective channel permitting the operative channel to continue providing proper control but in an unmonitored mode. Alternatively the embodiments may be arranged in a fail operational, monitored mode whereby after the first failure and disablement of the first channel the second channel continues to operate in a monitored mode so that a second failure results in a fail passive condition.

Referring now to FIG. 1, the dual electromechanical servo actuator embodiment utilizing a single model, monitor and equalizer is illustrated. Since the basic dual actuator is substantially the same as that described in said U.S. Pat. Nos. 4,035,705 and 3,504,248 as well as in said Ser. No. 811,653, the actuator, per se, will only be briefly described herein in continuity.

The actuator of FIG. 1 comprises dual channels 10 and 11 respectively, the channels being substantially identical with respect to each other. The servo channel 10 includes an electric servo motor 12 whose output shaft 13 is coupled through suitable gearing 14 as one input to a mechanical differential 15. A tachometer generator 16 is included to provide a servo rate signal on a lead 17. The tachometer generator 16, normally an integral part of motor 12, provides the servo rate signal on the lead 17 and therefore may be considered as being coupled to the motor output shaft 13. A brake 20 is coupled to the output of the servo motor 12 to selectively arrest motion of the servo channel 10 and hence clamp the one differential input. The brake 20 is preferably of the spring loaded variety whereby removal of a control signal on a lead 21 causes engagement of the brake. The output from the tachometer generator 16 is applied with a gain $K_{RATE}$ in negative feedback fashion to a summing input 22 of a servo amplifier 23. The output of the servo amplifier 23 is applied to drive the servo motor 21 thereby forming a closed loop servo with rate feedback. Position feedback is also provided in a manner to be described. The summing input 22 of the servo amplifier 23 is also responsive to an input command signal on a lead 24 for positioning the servo motor 12, such command signals including attitude, attitude rate and maneuver commands.

In a similar manner to that described with respect to the servo actuator channel 10, the channel 11 is comprised of servo motor 12' whose output 13' is applied through suitable gearing 14' as the other input to the differential 15. Tachometer generator 16' coupled to the servo motor output shaft 13' provides the servo channel rate feedback signal to the summing input 22' of the servo amplifier 23'. Position feedback is also provided in a manner which will be described. The summing input 22' of the servo amplifier 23' is responsive to the common input command 24 for positioning the servo motor 12'. In the manner described above with respect to the brake 20, brack 20' is actuated to clamp the servo channel output upon removal of the signal from the line 21' thereby clamping the other differential input.

The output from the differential 15 is applied through suitable gearing 25 to a clutch 26 and drum 27 which in turn positions an output member or control surface 30 of an aircraft either directly or through a conventional hydraulic boost operator. As described in the referenced DeWalt application and Miller patent, due to the inherent torque transfer characteristics of the differential 15, a malfunction in either servomotor channel will result in an almost simultaneous large differential velocity between the two differential inputs without producing significant motion of the control surface.

Substantially identical position transducers 31 and 31' (such as synchros, linear resolvers or potentiometers) provide negative position feedback signals to the summing inputs 22 and 22' of the servo amplifiers 23 and 23' with gains $K_{POS}$ thereby closing the servo loans. The position transducers 31 and 31' are geared to the output of the differential 15 through suitable gearing 32 and 32'. The position feedback outputs of transducers 31 and 31' represent the sum of the position outputs from the servo channels 10 and 11 as provided by the differential 15. It will be appreciated that if the position transducers 31 and 31' are synchro or linear resolver devices, demodulation circuits are utilized to convert the a.c. signals to the d.c. feedback signals required by the servo amplifiers 23 and 23'. Where transducers 31 and 31' are potentiometers, then the d.c. signal output from the transducer is fed back to servo amplifiers thereby tightening the loop by eliminating any time delays associated with demodulation circuits.

Equalization circuits 33 responsive to the servo rate outputs from the tachometer generators 16 and 16' provide equalization signals to the summing inputs 22 and 22' of the servo amplifiers 23 and 23'. For reasons similar to those discussed in said U.S. Pat. Nos. 3,504,248 and said 4,035,705 as well as in said Ser. No. 811,653, the equalization circuit 33 tends to reduce long term differences in servo motor rates with respect to the servo motors 12 and 12' during normal operation. Because of differences in servo drive and servo amplifier transfer characteristics, the servo motors 12 and 12' do not necessarily attain zero steady rates but may maintain some small non-zero steady state rate. Because, in a manner to be described, the motor rates are utilized for failure detection and isolation, any steady state rate would offset failure comparison thresholds thereby increasing susceptibility to false failure detection. The equalization circuit 33 subtracts the output of the tachometer generator 16 from the output of the tachometer generator 16' and provides an equalization signal in subtractive fashion to the summing input 22 and in additive fashion to the summing input 22', thereby reducing the difference in rate between the tachometer generators 16 and 16' to force a zero steady state. The detailed circuitry for the equalization circuit 33 will be discussed below with respect to FIG. 2.

The dual electromechanical servo actuator of FIG. 1, in accordance with the invention, includes electronic model circuitry 34 responsive to the common input command 24. The model 34 simulates the transfer function of the dual closed loop servo providing a simulated servo rate response on a lead 35, in response to the input command 24, in accordance with the closed loop dynamic response of the servo. Since the channels 10 and 11 are substantially identical, the model 34 of the single model embodiment of FIG. 1 provides only one simulated rate output on the lead 35. For purposes of simplicity the model 34 does not include simulation of variations in actuator loads since the failure detection procedure to be later described compensates for false failure detection caused by actuator load variations. It will be appreciated, however, that this parameter could also be simulated in the model 34. Detailed circuitry for the model 34 will be described below with respect to FIG. 3.

The dual servo actuator of FIG. 1 further includes, in accordance with the invention, a monitor circuit 36 responsive to the model rate signal on the lead 35. The monitor 36 is also responsive to the servo rate signals from the tachometer generators 16 and 16'. The monitor detects a failure by comparing the rate outputs from the tachometer generators 16 and 16' with respect to each other, providing a failure detection enabling signal when the difference therebetween exceeds a predetermined threshold. The monitor circuit 36 also determines which of the servo channels has failed by comparing the servo rate output of each tachometer generator with the simulated rate output from the model 34 thereby isolating the failure with respect to the failed channel. The monitor 36 then disables the failed channel by applying a failure signal to the appropriate lead 21 or 21' to actuate the appropriate servo channel brake.

Upon detecting a failure the monitor 36 disables the equalization circuit 33 via a lead 37 for reasons to be discussed. Depending upon the mode in which the system is being utilized, the monitor 36 may reduce the gain of the model 34 via a lead 40 and may either temporarily disable itself so as to prevent erroneous brake actuation of the valid channel during the braking procedure of the failed channel or may permanently disable itself for reasons to be discussed. Thus the monitor 36 compares servo channel rates to evaluate actuator integrity and compares servo channel and model rates to evaluate individual channel performance. A failure is detected and channel isolation enabled when the channel rates differ with respect to each other in excess of a threshold. The failed channel is then isolated when its rate differs from the model rate in excess of a threshold. Detailed circuitry of the monitor 36 will be discussed below the respect to FIG. 4.

Figure 2:
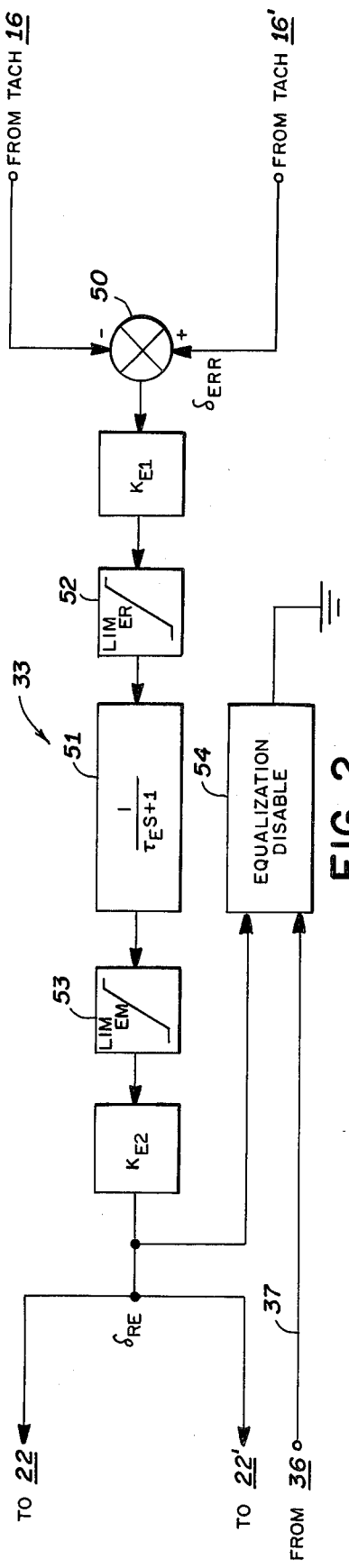
FIG. 2 is a schematic block diagram of the equalization circuit of FIG. 1.

Referring now to FIG. 2, a detailed block diagram of the rate equalization circuit 33 is illustrated. The outputs from the tachometer generators 16 and 16' are applied to a summing junction 50 wherein the rate output from the tachometer generator 16 is subtracted from that of the tachometer generator 16'. The difference signal is applied through a gain $K_{EL}$ which establishes the equalizer sensitivity. The rate error signal is applied to an equalization lag circuit 51 via a limiter 52. The time constant $\tau_E$ of equalization lag circuit 51 and the value of limiter 52 are chosen to equalize long term rate errors which minimizing the effects of equalization during normally commanded short term actuator transients. The output of the equalization lag circuit 51 is applied through a magnitude limiter 53 and a gain $K_{E2}$ to provide the equalizer correction signals to summing inputs 22 and 22' (FIG. 1). The limiter 52 and the passive gain $K_{E2}$ prevent large input errors from causing equalization over-compensation prior to failure detection. This minimizes transients caused by disabling the equalization circuitry when the system is switched to single channel mode in a manner to be explained. The limiter 53 restricts the maximum possible equalization output. The equalizer output is applied to the summing input 22 in subtractive fashion and to the summing input 22' in additive fashion, thereby tending to reduce rate differences between the outputs of the tachometer generators 16 and 16' to zero. After detection of failure the equalizer 33 is disabled by the monitor circuit 36 via a signal on the lead 37 by grounding the equalizer output through an equalization disable switch 54.

It will be appreciated that equalizers utilizing a lag circuit rather than integrators provide an advantage in that integrators tend to drift as long as there is a residual small input thereto whereas a log circuit attains a steady state condition. Additionally, an equalizer utilizing a lag circuit tends to response faster than equalizers utilizing integrators.

Figure 3:
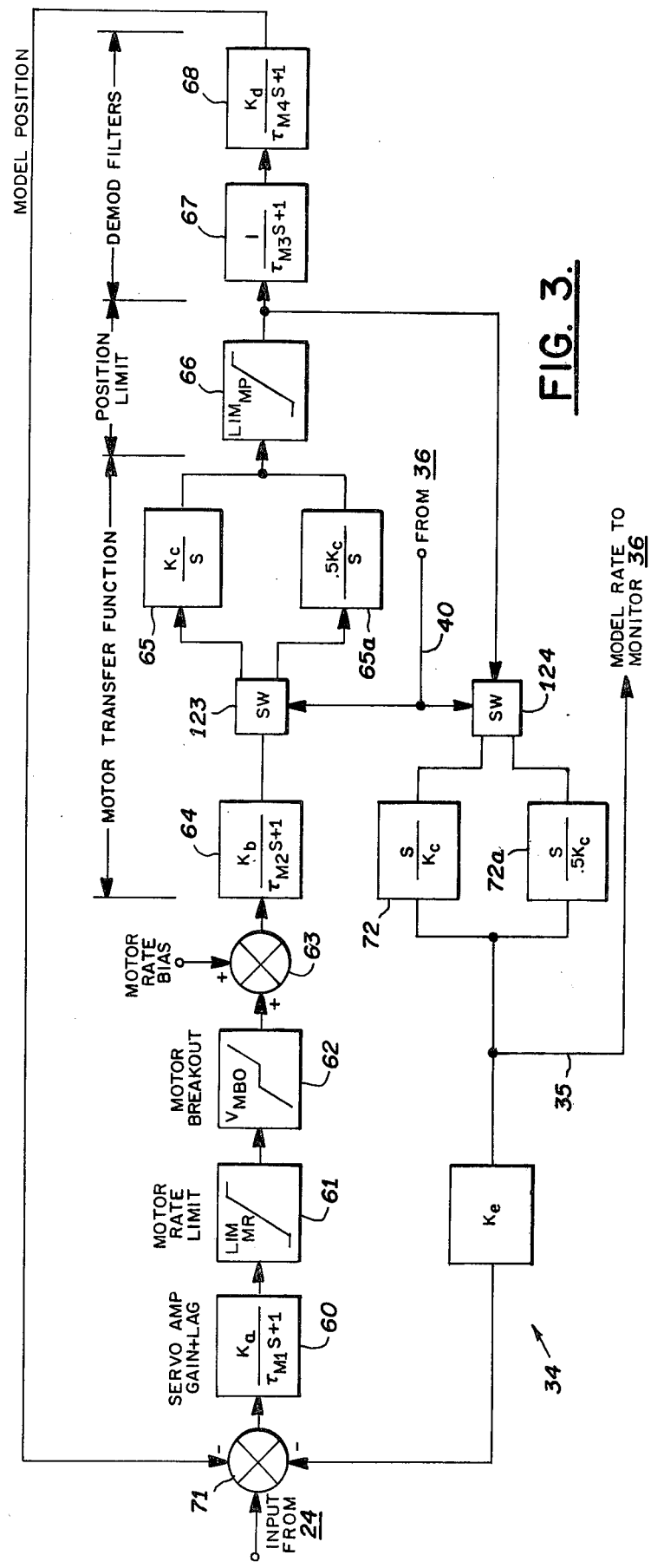
FIG. 3 is a schematic block diagram of the electronic model of FIG. 1.

Referring now to FIG. 3, a detailed schematic block diagram of the electronic model 34 utilized, in accordance with the invention, in the dual electromechanical servo actuator of FIG. 1 is illustrated. The model 34 is responsive to the input command on the line 24 to simulate the closed loop dynamic transfer function of the dual servo actuator. Means are also included to change the model gain to simulate single channel operation after a failure. While in the illustrated embodiment the model 34 is a fifth-order model that includes non-linearities associated with motor breakout and rate limit, it will be understood that models of greater or lesser orders may be employed depending upon the particular application. The model 34 provides a single rate output on the line 35 representing the rate response of both servo channels 10 and 11.

The servo amplifier circuitry of the dual servo actuator is simulated by a servo amplifier gain and lag simulation circuit 60 having the transfer function indicated by the legend. The input command signal transmitted through the simulation circuit 60 is applied to a non-linear circuit 61 simulating servo motor rate limit. The output of the motor rate limit simulator 61 is applied to a non-linear motor breakout simulator 62 whose output is in turn applied through a summing junction 63 to components simulating the motor transfer function. A motor rate bias signal is summed into the summing junction 63 to simulate the differences between motor rate characteristics in the clockwise and counter clockwise directions of rotation.

The motor transfer function is simulated by a gain and lag circuit 64 and a switch selectable integrator 65 or 65a. The output of the motor transfer function simulation circuits 64 and 65, 65a, is applied through a position limit simulation circuit 66 to demodulator filter simulation circuits 67 and 68. The rate limit and position limit circuits 61 and 66 respectively simulate the inherent servo motor rate limit of the servo actuator and the output member control surface limiting device (not shown). The demodulator filter simulation circuits 67 and 68 simulate the demodulators that are utilized with the sychro position pick offs 31 and 31' as discussed above. The output of the demod filter 68 provides the model servo position simulation output which is applied in negative feedback fashion to a summing junction 71 which receives the input command from the line 24 and provides the input to the servo amplifier simulation circuit 60.

A switch selectable differentiating circuit 72 or 72a is coupled to the position output from the position limit block 66 to provide the simulation for the tachometer generators 16 and 16' thereby providing the model rate signal on the lead 35. The output of the tachometer generator simulation circuit 72 is also applied through a gain $K_E$ in negative feedback fashion to the summing junction 71.

As discussed above, the signal on the lead 40 from the monitor 36 is applied to the switch blocks 123 and 124 in a manner to select the reduced gain parameter 0.5 $K_C$. This provision is utilized for model gain adjustments with respect to a first detected failure for simulating the dual servo prior to the failure and the remaining valid channel after the failure. The signal on line 40 selects the appropriate gain for matching the model to the dynamic response of the actuator when operating in both the dual channel and single channel modes. It is appreciated that other gain changing arrangements may be utilized to the same effect.

Thus the purpose of the electronic model 34 is to provide a theoretical actuator with outputs that can be compared with the basic dual actuator outputs for failure detection, isolation and recovery. The model 34 does not simulate actuator loads and this provision is accounted for to prevent false failure detection caused by actuator load variations in a manner to be described with respect to the monitor 36. It will be appreciated that although a single channel model is illustrated in FIG. 3, a dual channel model may also be utilized in a manner to be described with respect to FIG. 5. The single channel model in effect provides a third servo channel commanded by the single input command common to the model and both servo channels with the model output being compared to both channel outputs. Although a particular model configuration was chosen for the described embodiment of the invention, other model arrangements may be utilized in practicing the invention.

Figure 4:
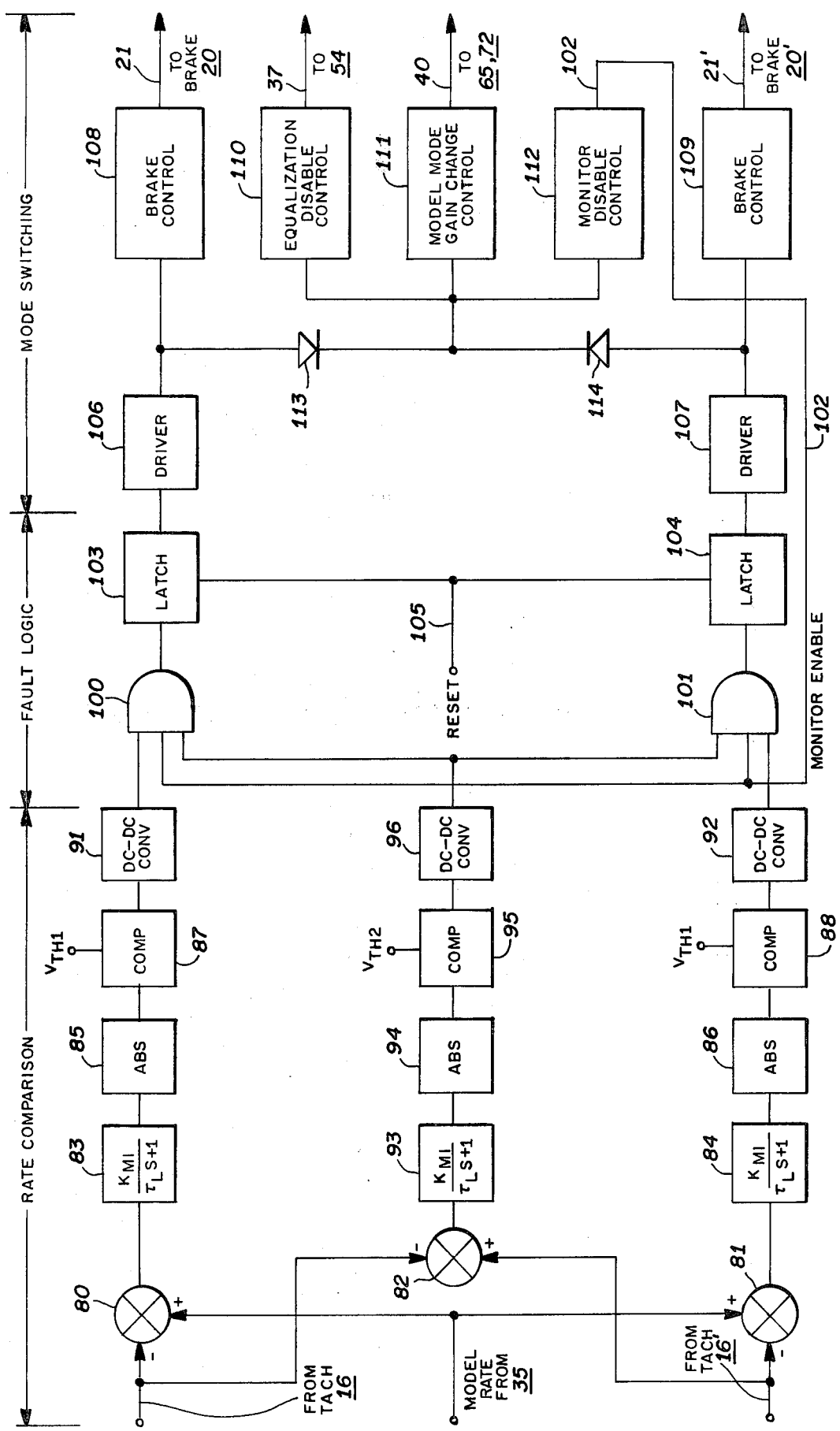
FIG. 4 is a schematic block diagram of the monitor of FIG. 1.

Referring now to FIG. 4, a schematic block diagram of the monitor 36 is illustrated. The failure monitor 36 is utilized to detect a servo actuator failure, to isolate the failure to the proper channel and to deactivate the failed channel. In order to accomplish these functions the monitor 36 evaluates actuator performance during transient states while remaining insensitive to actuator load variations. The failure detection and isolation functions are performed by comparing servo channel rates in order to evaluate actuator integrity and by comparing servo channel and model rates to evaluate individual channel performance. A failure is detected and channel isolation enabled when the channel rates differ in excess of a threshold. After enablement of the monitor 36, the failed channel is isolated when its rate differs from the model rate in excess of a threshold. Thereafter an appropriate channel failure discrete signal is latched on and the failed channel disabled permitting continued single servo motor operation. The monitor 36 is configured to perform continuous monitoring during dynamic actuator operation and to minimize false detection resulting from load variations by requiring channel rate disagreement before a failure is recognized.

The monitor 36 comprises a rate comparison section, a fault logic section and a mode switching section as indicated by the legends. The rate comparison section compares model and actuator rates, evaluates the rate differences and provides appropriate status discrete output signals. The fault logic section provides the criteria for failure recognition and the mode switching section provides the required control signals for servo actuator mode selection.

The rate comparison section includes summing junctions 80 and 81 responsive to the model rate and to the outputs from tachometers 16 and 16' respectively to provide rate error signals with respect to the comparison between the model rate and the rates from channels 10 and 11 respectively. The rate comparison section also includes a summing junction 82 responsive to the outputs of the tachometers 16 and 16' to provide a rate error signal with respect to the rate differences between the two channels. The error signals representing the rate differences between channels 10 and 11 and the model 34 are provided respectively by the summing junctions 80 and 81 and are applied through respective amplifiers 83 and 84 and respective absolute value circuits 85 and 86 to respective comparators 87 and 88. The amplifiers 83 and 84 have gain constants $K_{M1}$ which establishes the error monitor gain and lag $T_L$ which establishes the error monitor lag time constant. The absolute value circuits 85 and 86 take the absolute values of the outputs from the respective amplifiers 83 and 84 and apply these signals as inputs to the respective threshold comparators 87 and 88. Additionally each of the comparators 87 and 88 receives as an input a threshold signal $V_{TH1}$ and provides an output when the associated input signal from the associated absolute value circuit exceeds the threshold. The outputs from the comparators 87 and 88 are applied through d.c.-d.c. converters 91 and 92 respectively to provide status discrete outputs indicating whether or not the respective error signal is within its threshold. The d.c.-d.c. converters 91 and 92 are utilized for logic level matching between the rate comparison circuitry and the fault logic circuitry. Thus the outputs of the converters 91 and 92 provide status discrete signals representing respective rate comparisons between channel 10 and model 34 and channel 11 and the model 34 indicating a failure in the respective channel when the respective error signal exceeds the threshold $V_{TH1}$.

The rate error signal from the summing junction 82 representing the rate difference between the two channels is applied through an amplifier 93, an absolute value circuit 94, a comparator 95 and a d.c.-d.c. converter 96 in a manner similar to that described with respect to the error signals from the summing junctions 80 and 81. The amplifier 93 has a gain of $K_{M1}$ and a lag of $T_L$ which establishes the monitor gain and lag time constant as described above. The comparator 95 additionally receives a threshold input signal $V_{TH2}$ and provides an output when the signal from the absolute value circuit 94 exceeds the threshold. The d.c.-d.c. converter 96 is utilized for logic level matching as discussed above and provides a status discrete signal indicating whether or not the inter-channel rate comparison error is within the threshold $V_{TH2}$. The threshold $V_{TH2}$ is set significantly lower than the threshold $V_{TH1}$ to minimize false detection resulting from load variations in a manner to be explained.

The status discrete signals from the d.c.-d.c. converters 91, 92 and 96 are applied to the fault logic section of the monitor 36 which provides the combinational logic for fault recognition and isolation. The outputs from the d.c.-d.c. converters 91 and 92 are applied as inputs to respective AND gates 100 and 101. The output of the d.c.-d.c. converter 96 is applied in common as a second input to each of the AND gates 100 and 101. A third input to each of the AND gates 100 and 101 is provided by a monitor enable signal on a line 102. The outputs of the AND gates 100 and 101 are applied as inputs to respective latches 103 and 104 which latch into a set state in response to the associated failure discrete signals transmitted through the gates 100 and 101. Once latched on, each of the latches 103 and 104 continues to provide its output until reset by a signal on a reset line 105.

As explained above, the model 34 does not provide simulation for variations in actuator load. When a load variation is experienced by the actuator, the dual channels 10 and 11 both respond in the same manner providing similar variations in their rate outputs. The model, however, does not respond to the load variation and therefore its simulated rate does not match the actual channel rates due to the load variation. Under these conditions since the channel rates will track with respect to each other (in the absence of a failure), the threshold $V_{TH2}$ of the comparator 95 is not exceeded and thus the output of the converter 96 holds the AND gates 100 and 101 in a disabled condition. With the AND gates 100 and 101 disabled, the outputs from the converters 91 and 92 which are indicative of channel-model rate discrepancies, will not be transmitted to the latches 103 and 104. A discrepancy between the channel rates in excess of $V_{TH2}$ is first required to enable the AND gates 100 and 101 before a model-channel rate discrepancy can be transmitted to the latch 103 or the latch 104. Thus false failure detection resulting from load variations is minimized by requiring channel rate disagreement before recognizing a failure with respect to the individual channels.

Thus a discrete output representing failure of channel 10 is set into the latch 103 when the monitor is enabled by a signal on the lead 102, the channel rate error exceeds the threshold $V_{TH2}$ and the channel 10-model rate error exceeds the threshold $V_{TH1}$. Similarly a discrete output representing failure of channel 11 is set into the latch 104 when the monitor 36 is enabled by the line 102, the channel rate error exceeds the threshold $V_{TH2}$ and the channel 11-model rate error exceeds the threshold $V_{TH1}$.

The mode switching section includes drivers 106 and 107 and the controls necessary to disable the failed channel and switch to single servo motor operation. The mode switching section includes brake controls 108 and 109 for applying the brake control signals to the lines 21 and 21' respectively. The mode switching section further includes equalization disable control 110, model gain changing control 111 and monitor disable control 112 for providing the necessary control signals to the lines 37, 40 and 102 respectively. The drivers 106 and 107 provide the interface circuitry between the input fault logic discretes and the brake, equalization, monitor and model gain changing controls. Diodes 113 and 114 are included for isolation whereby a failure in either channel causes disablement of the equalization circuit 54, the monitor 36, model gain change control, and application of the appropriate brake control in accordance with the failed channel. The monitor disable control 112 provides either permanent or temporary monitor disablement in accordance with the desired operating mode of the system.

In operation the above described dual channel servo actuator may be utilized whereby after a first failure the failed channel is clamped, the monitoring is totally disabled with the remaining channel continuing to operate without monitoring. This actuator configuration may be utilized, for example, in remotely piloted drone aircraft. Alternatively the dual channel servo actuator of the present invention may be utilized in a first failure fail-operative, second failure fail-passive mode wherein after the first failure the failed channel is clamped, the equalization is disabled, the monitor is momentarily disabled during channel braking and the model gain is changed with the valid channel continuing monitored fail-passive control of the aircraft. When a second failure occurs the second channel is clamped and the system deactivated. This mode of operation may be utilized in commercial, general aviation, or military aircraft where fail operative performance is required.

Prior to a failure and in both modes of operation the monitor disable control 112 provides an enabling signal to the line 102 thereby enabling the AND gates 100 and 101. The output from the d.c.-d.c. converter 96, however, maintains the AND gates 100 and 101 disabled until the channel rates disagree with respect to each other in excess of the threshold $V_{TH2}$. As discussed above, this prevents false disablements due to load variations. When, however, a failure occurs in one of the channels, the cross-channel rate error will exceed the threshold $V_{TH2}$ thereby applying an enabling signal to both of the AND gates 100 and 101. The rate comparison of the failed channel with respect to the model rate will exceed $V_{TH1}$ thereby fully enabling the associated one of the AND gates 100 or 101 setting the associated one of the latches 103 and 104. The signal from the set latch applies the brake of the failed channel via the associated brake control 108 or 109, in accordance with the failed channel. The set latch through either the diode 113 or 114, enables the equalization disable control 110, the model gain change control 111 and the monitor disable control 112. As discussed above with respect to FIG. 2, the equalization disable control 112 applies a signal via the line 37 to ground the output of the equalization circuit 33. In the mode wherein the system will thereafter operate without monitoring, the monitor disable control 112 applies a permanent disabling signal to the AND gates 100 and 101. In this mode of operation since model monitoring is no longer utilized after the first failure, the model gain change control 111 need not be enabled. The equalization circuitry is disabled after failure since channel rate equalization will be detrimental with one of the channels clamped.

In the fail operative mode the monitor disable control 112 is configured to temporarily disable the AND gates 100 and 101 after detection of a first failure so as to prevent erroneous setting of the latch associated with the valid channel during braking of the failed channel. In response to the first failure the associated latch is set and will remain set until a signal is applied to the reset line 105. After the braking operation is accomplished the monitor disable control 112 reapplies an enabling signal to the line 102 whereby a second failure may be detected with respect to the comparison between the valid channel rate and and the model rate. In effect, one-half of the monitor circuit 36 is disabled after the first failure by reason of the associated latch remaining in its set state irrespective of outputs from the associated AND gate.

In the fail operative mode the equalization circuitry 33 is disabled, as described above, by the equalization disable control 110. In this mode the model gain change circuit 111 provides a signal on the line 40 which reduces the model gain by one-half so as to match the model response to the single channel operation of the actuator effected after the first detected failure as described with reference to FIG. 3. In effect, the signal on the line 40 divides the model gain constant $K_C$ (FIG. 3) by two. In one preferred embodiment of the invention a 0.2 second disablement of the monitor is, for example, utilized after detection of the first failure. Other time constants may, of course, be used depending upon the application. In a preferred embodiment of the invention the model-channel rate error threshold $V_{TH1}$ is set to be exceeded by a rate difference of 100 rpm whereas the cross channel rate error threshold $V_{TH2}$ is set whereby a 30 rpm rate difference exceeds the threshold. These velocity values may be selected as required by the specific application. The monitor 36 utilizes servo motor rate for fault isolation as well as for fault detection. It will be appreciated that servo position information could also have been utilized for fault detection.

Thus it is appreciated that the dual servo actuator system of the present invention not only permits continued single channel unmonitored operation after a first failure, but may also include the fail-passive feature whch permits the system to fail operational for the first failure by continuing single channel monitored operation and to fail passive for a second failure by clamping the second failed channel. As discussed above, in order to incorporate the fail-passive operation the model 34 may switch between simulation of dual motor and single motor operation by including gain changing switches as at 123, 124 of FIG. 3 to select the appropriate value for the gain $K_C$ from blocks 65, 65a and 72 and 72a respectively and by including the model mode control 111 to control the model gain. In this mode the monitor disable command is a momentary command of, for example, 0.2 seconds which prevents false failure detection due to transients during channel braking and model mode switching. After the first failure the system converts to the fail-passive configuration as described above.

The above described embodiment of FIG. 1 comprises a dual redundant servo actuator with a single model, monitor and equalizer comprising in effect a third servo channel, all three channels being responsive to the single input command. Referring now to FIG. 5 in which like reference numerals indicate like components with respect to FIG. 1, a fully redundant dual servo actuator with model, monitor and equalization circuits in each channel is illustrated. The two channels are responsive to dual redundant input command sources. It is appreciated, however, that a single input command source may alternatively be utilized. The configuration and operation of most of the components of FIG. 5 are identical to those similarly referenced components of FIG. 1 and only those components that are unlike those previously discussed will now be described. The embodiment of FIG. 5 includes dual redundant electronic models 120 and 120' in channels 10 and 11 respectively. Each of the models 120 and 120' is identical to the model illustrated and discussed with respect to FIG. 3. The inputs and outputs to the models 120 and 120' are also identical to those described above.

The channels 10 and 11 also include respective equalization circuits 121 and 121' which are identical to the equalization circuit illustrated and described with respect to FIG. 2. The inputs and outputs to the equalization circuits 121 and 121' are also identical to those described above.

The channels 10 and 11 include respective monitor circuits 122 and 122' which function in a manner similar to that described above with respect to FIG. 4. The monitor circuit 122 compares the channel rates with respect to each other to enable the monitor and compares the tachometer rate from channel 10 with the simulated model rate from the model 120 to detect failure with respect to channel 10 and to consequently apply the brake 20. The monitor 122' similarly compares the channel rates with respect to each other and compares the channel rate from tachometer 16' with the simulated model rate from the model 120' to actuate the brake 20'. Since the monitoring functions are performed in dual redundant fashion as compared to the single channel comparison described above with respect to FIGS. 1 and 4, the monitor circuits 122 and 122' are configured somewhat differently from the monitor circuit 36 depicted in FIG. 4. Basically the monitor 122 is comprised of the upper and middle strings of components and the monitor 122' is comprised of the middle and lower strings of components illustrated in FIG. 4 with the mode switching logic being repeated in both monitors.

Figure 6:
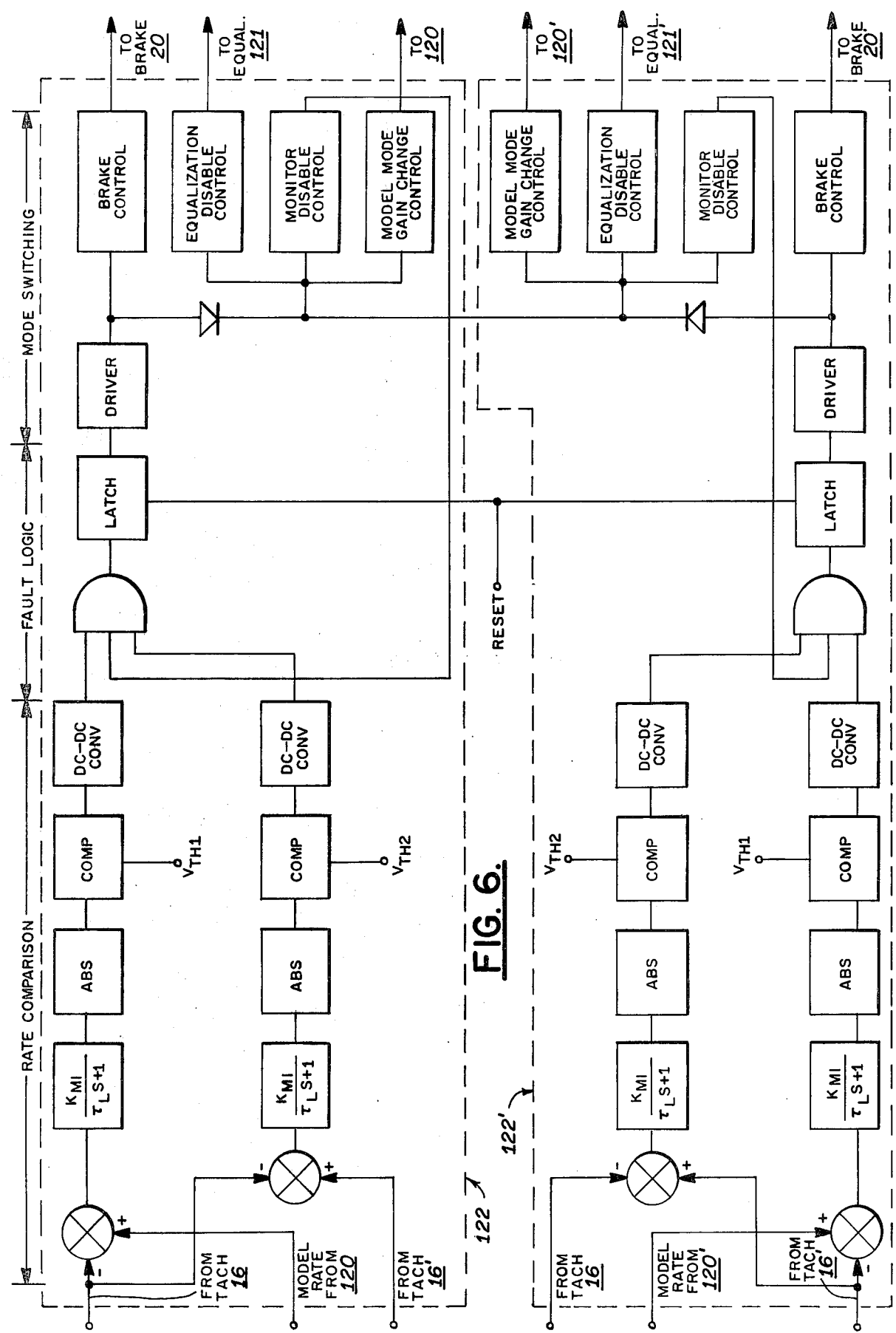
FIG. 6 is a schematic block diagram of the dual redundant monitor circuit utilized in FIG. 5.

FIG. 6 illustrates the details of the monitor circuits 122 and 122' where the components thereof are configured and function in a manner similar to that described above with respect to FIG. 4. The output of either of the d.c.-d.c. converters enable both AND gates so that the failure discrete signal from the faulty channel can set the appropriate brake. When failure in either channel is detected, the equalization disable controls disable both equalization circuits 121 and 121' in the manner and for the reasons discussed above with respect to FIGS. 1 and 2.

The embodiment of FIG. 5 operates in the same functional modes as described above with respect to FIG. 1. When the actuator operates in the mode wherein after a first failure the monitoring is disabled, both of the monitor disable controls of FIG. 6 apply a permanent disabling signal to the respective AND gates. Thus in this mode after the first failure the defective channel is clamped and the valid channel operates unmonitored.

In the mode wherein the actuator fails operational after the first failure and fails passive after the second failure, both of the monitor disable controls of FIG. 6 temporarily disable the respective AND gates during the braking of the effective channel and thereafter reapplies an enabling signal. The monitor (122 or 122') of the valid channel thereafter continues to provide monitoring for the valid channel. In this mode the model mode control of the monitor 122 reduces the gain of the model 120' and the model mode control of the monitor 122' decreases the gain of the model 120 after the first failure. It is appreciated, for the reasons discussed above, that the monitor of the failed channel is effectively disabled since the associated latch remains in its set condition after detecting the failure and thereafter is not responsive to further indications from its associated AND gate. The monitor of the valid channel, however, continues to function normally since its latch has not yet been set.

It is appreciated from the foregoing that the actuator modeling and failure monitoring techniques described hereinabove provide an effective and versatile dual servo actuator system. The actuator can be adapted to provide either fail-operative and/or fail-passive modes of operation and can be utilized in the triplex (dual servo with a model and monitor) arrangement of FIG. 1 or in the dual-dual (dual servo with dual models and monitors) configuration of FIG. 5. The triplex system of FIG. 1 is less complex than that of FIG. 5 but the dual-dual arrangement of FIG. 5 provides greater system reliability.

Thus the present invention provides a dual electromechanical actuator that has fail operational performance, a high probability of detecting, isolating and recovering from failures, and the rapid recovery time required of actuators for use on aircraft primary control surfaces. Not only does the present invention provide enhanced reliability, and high probability of failure detection, but it also provides such extremely rapid recovery that only small control surface displacements occur due to failure.

Although the above described embodiments of the invention were discussed in terms of the model illustrated in FIG. 3, it will be appreciated that other modeling arrangements could also be utilized. It will further be appreciated that although the above described embodiments of the invention advantageously utilize channel and model rate comparisons, other modeling schemes utilizing other actuator parameters (such as position or acceleration) may also be employed.

The model monitoring techniques discussed above detect and isolate a failure when the channel rates differ, for example, by more than 30 rpm and when the faulty channel rate differs from the model rate by, for example, more than 100 rpm. The monitor then disables the failed channel by braking the motor. This permits continued operation utilizing the remaining good channel either unmonitored or in a fail passive monitored arrangement. The present invention may be utilized in either remotely piloted aircraft or in piloted military and commercial and applications wherein after system failure in an unmonitored mode or in a fail passive mode the actuator may be manually disengaged.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. An electromechanical servo actuator system having dual redundant servo channels for positioning a positionable load in response to input command means, comprising
    first and second electromechanical servo loop means responsive to said input command means having first and second electric servo motor means respectively and differential means having two inputs coupled to receive the respective outputs of said first and second electric servo motor means and having an output for positioning said positionable load, and first and second brake means respectively for arresting movement of said respective servo motor inputs to said differential means,
    first and second sensor means associated respectively with said first and second servo loop means for providing first and second parameter signals representative of a predetermined servo loop characteristic,
    electronic model means for electronically simulating the electromechanical characteristics of said servo loop means in response to said input command means and for providing a model parameter signal representative of the simulated predetermined servo loop characteristic, and
    monitor means responsive to said first and second parameter signals and said model parameter signal for providing a failure signal, indicative of a failed channel, to said brake means of said failed channel, thereby arresting the movement of said failed channel and permitting the operative servo actuator channel to continue positioning said load through said differential means.

2. The actuator system of claim 1 in which
    said first and second sensor means comprise first and second tachometer generator means for providing first and second actuator rate signals in accordance with the rate outputs of said servo motor means respectively, and
    said simulated servo loop characteristic comprises simulated actuator rate.

3. The actuator system of claim 2 in which said actuator rate signals are applied in said respective servo loop means as rate feedback signals therefor.

4. The actuator system of claim 1 in which said monitor means includes
    first comparator means for providing a first failure indication signal when the difference between said first parameter signal and said model parameter signal exceeds a predetermined threshold,
    second comparator means for providing a second failure indication signal when the difference between said second parameter signal and said model parameter signal exceeds a predetermined threshold,
    third comparator means for providing a failure detection enabling signal when the difference between said first and second parameter signal exceeds a predetermined threshold, and
    enabling means responsive to said first and second failure indication signals and said failure detection enabling signal for rendering said first and second failure indication signals effective in accordance with said failure detection enabling signal thereby providing said failure signal to actuate said brake means of said failed channel.

5. The actuator system of claim 4 in which said enabling means comprises first and second AND gate means both responsive to said failure detection enabling signal and respectively responsive to said first and second failure indication signals for transmitting said failure indication signals in accordance with said failure detection enabling signal whereby providing said failure signal.

6. The actuator system of claim 5 in which said monitor means further includes first and second latch means coupled to receive the respective outputs of said first and second AND gate means for latching into a set state upon transmission of the associated failure indication signal through the associated AND gate means thereby providing said failure signal.

7. The actuator system of claim 4 in which said predetermined thresholds associated with said first and second comparator means are equal to each other and greater than said predetermined threshold associated with said third comparator means.

8. The servo actuator system of claim 5 in which said monitoring means further includes monitor disable control means responsive to said failure signal for disabling said AND gate means upon detection of a failure when operating in a first mode and for momentarily disabling said AND gate means when operating in a second mode.

9. The actuator system of claim 1 in which said electronic model means includes
    motor transfer function circuit means for simulating the transfer function of said servo motor means,
    motor breakout circuit means for simulating the breakout characteristics of said servo motor means,
    motor rate limit circuit means for simulating the rate limit of said servo motor means, and
    motor rate bias means for providing a bias signal for simulating the differing rate responses of said servo motor means with respect to signals commanding clockwise and counterclockwise rotation thereof.

10. The actuator system of claim 9 in which
    said sensor means comprise tachometer generator means for providing actuator rate signals representative of servo motor rate, said actuator rate signals being utilized to provide negative feedback for damping said servo loop means, said actuator rate signals providing said first and second parameter signals, and
    said system further includes actuator position sensor means for providing negative position feedback closing said servo loop means.

11. The actuator system of claim 10 in which said electronic model means further includes
    circuit means for providing a feedback path around said electronic model means for simulating said actuator position feedback of said servo actuator system, and rate circuit means for providing a rate feedback path around said electronic model means for simulating said rate feedback of said actuator system, said rate circuit path means providing said model parameter signal.

12. The actuator system of claim 1 in which said monitor means further includes model mode control means responsive to said failure signal for providing a gain control signal to said electronic model means for changing the gain thereof to simulate single channel operation of said actuator system after braking said failed channel.

13. The actuator system of claim 11 in which said monitor means further includes model mode control means responsive to said failure signal for providing a gain changing signal to said motor transfer function circuit and said rate circuit of said model means for changing the gain thereof to simulate single channel operation of said actuator system after braking said failed channel.

14. The actuator system of claim 1 in which said first and second sensor means comprise first and second tachometer generator means for providing first and second actuator rate signals representative of the rate of said servo loop means respectively, said first and second actuator rate signals providing rate feedback around said first and second servo loop means respectively.

15. The actuator system of claim 14 further including equalization means responsive to said first and second actuator rate signals for providing signals to said first and second servo loop means in a manner tending to render said actuator rates equal to each other.

16. The actuator system of claim 15 in which said equalization means comprises
difference means responsive to said first and second actuator rate signals for providing the difference therebetween,
lag circuit means response to said difference signal, and
means for coupling the output of said lag circuit means to said first and second servo loop means with polarities tending to render the rates of said first and second servo loop means equal to each other.

17. The servo actuator system of claim 15 in which said monitor means further includes equalization disabling means responsive to said failure signal for providing a disabling signal to said equalization means in response to said failure signal.

18. The actuator system of claim 1 in which said positionable load comprises an aerodynamic control surface of an aircraft.

19. The actuator system of claim 1 in which
said electronic model means comprises first and second electronic model means for electronically simulating the electromechanical characteristics of said servo loop means in response to said input command means and for providing first and second model parameter signals representative of the simulated predetermined servo loop characteristic, and
said monitor means comprises first and second monitor means each responsive to said first and second parameter signals, said first and second monitor means being responsive to said first and second model parameter signals respectively for providing first and second failure signals respectively indicative of failure of a respective channel, said first and second failure signals being applied to said first and second brake means respectively to actuate said brake means of said failed channel,
thereby arresting the movement of said failed channel permitting the operative servo actuator channel to continue positioning said load through said differential means.

20. An electromechanical servo actuator system having dual redundant servo channels for positioning a positionable load in response to input command means, comprising
first and second electromechanical servo loops responsive to said input command means having first and second electric servo motors respectively, differential gear means having two inputs coupled to receive said outputs of said first and second servo motors respectively and having an output for positioning said positionable load, first and second brake means respectively for clamping the respective inputs to said differential means and first and second tachometer generators coupled respectively to said first and second servo motors for providing first and second actuator rate signals respectively as rate feedback around said first and second servo loops respectively,
electronic model means for electronically simulating the electromechanical characteristics of said servo loops in response to said input command means and for providing a model rate signal representative of simulated actuator rate, and
monitor means for comparing said actuator rate signals with said model rate signal and for providing a failure signal, indicative of a failed channel, to actuate said brake means of said failed channel when the difference between at least one of said actuator rate signals and said model rate signal exceeds a predetermined threshold,
thereby clamping said failed channel and permitting the operative servo channel to continue positioning said load through said differential gear means.

21. The actuator system of claim 20 in which said monitor means comprises first comparator means for providing a first failure indication signal for actuating said first brake means when the difference between said first actuator rate signal and said model rate signal exceeds a predetermined threshold,
second comparator means for providing a second failure indication signal for actuating said second brake means when the difference between said second actuator rate signal and said model rate signal exceeds a predetermined threshold,
third comparator means for providing a failure detection enabling signal when the difference between said first and second actuator rate signals exceeds a predetermined threshold, and
enabling means for rendering said first and second failure indication signals effective in accordance with said failure detection enabling signal thereby providing said failure signal to actuate said brake means of said failed channel.

22. The actuator system of claim 21 in which said enabling means comprises
first and second AND gate means responsive to said failure detection enabling signal and responsive respectively to said first and second failure indication signals for transmitting said failure indication signals in accordance with said failure detection enabling signal, and first and second latch means coupled to receive the respective outputs of said first and second AND gate means for latching into a set state upon transmission of the associated failure indication signal through the associated AND gate means thereby providing said failure signal to actuate said brake means of said failed channel.

23. The actuator system of claim 22 in which said monitoring means further includes monitor disable control means for disabling said AND gate means upon detection of a failure when operating in a first mode and for momentarily disabling said AND gate means when operating in a second mode.

24. The actuator system of claim 22 in which said monitor means further includes model mode control means for providing a gain control signal to said electronic model means for changing the gain thereof upon detection of a failure to simulate single channel operation of said actuator system after braking said failed channel.

25. In a redundant dual servo actuator system of the type including first and second substantially identical servo actuators responsive respectively to first and second substantially identical control signal channels, each channel comprising a servo amplifier having an input responsive to a command signal and an output for controlling said actuator, a tachometer for providing an actuator rate feedback signal to said amplifier input and brake means for arresting movement of said actuator, differential means having input means coupled respectively to the outputs of said actuators and an output coupled to a positionable load and position feedback means responsive to said load position for supplying a position feedback signal to each of said amplifier inputs, monitoring means for said system comprising, electronic model means electronically duplicating the electromechanical chataceristics of said servo actuator including means for producing a signal corresponding to the rate characteristics thereof, comparator means responsive to said actuator rate feedback signals and said rate characteristic signal of said model means for providing a signal indicative of a failed channel, and means for supplying said last mentioned signal to the brake means of the failed channel for arresting its movement and providing a load at its corresponding differential input whereby the operative servo actuator channel may continue to position said positionable load.

* * * * *